United States Patent [19]

Brumann

[11] 4,203,028
[45] May 13, 1980

[54] APPARATUS FOR TREATING OPTICAL FIBERS BY SPARK EROSION

[75] Inventor: Joachim Brumann, Cologne, Fed. Rep. of Germany

[73] Assignee: Felten & Guilleaume Carlswerk AG, Cologne, Fed. Rep. of Germany

[21] Appl. No.: 868,832

[22] Filed: Jan. 12, 1978

[30] Foreign Application Priority Data

Aug. 6, 1977 [DE] Fed. Rep. of Germany ....... 2735567

[51] Int. Cl.² ...................... H05B 7/18; C03C 25/00; G02B 5/14
[52] U.S. Cl. .................................. 219/384; 65/11 R; 65/112; 65/175; 204/164; 219/388; 219/69 W
[58] Field of Search ............... 219/69 R, 69 W, 69 E, 219/383, 384, 388; 65/2, 11 R, DIG. 7, 112, 175; 204/164; 83/16, 365; 428/163; 250/531, 543

[56] References Cited

U.S. PATENT DOCUMENTS

| 2,987,600 | 6/1961 | Rexford | 219/383 X |
| 3,385,951 | 5/1968 | Bancroft et al. | 219/384 |
| 3,622,751 | 11/1971 | Larive | 219/384 |
| 4,039,309 | 8/1977 | Albanese et al. | 65/11 R X |
| 4,051,043 | 9/1977 | Harter et al. | 204/164 X |

OTHER PUBLICATIONS

Globe, Smith, Bisbee and Chinnock, *Optical Fiber End Preparation for Low-Loss Splices*, Bell Systems Technology Journal, vol. 52, No. 9, Nov. 1973, pp. 1579–1588.
Murata, Inao, Matsuda and Takahashi, *Splicing of Optical Fiber Cable on Site*, IEE Conference Publication, No. 132, 16–18, Sep. 1975, pp. i and 93–95.
Electronics Letters, Aug. 15, 1976, vol. 12, No. 17, pp. 443–444.

*Primary Examiner*—Volodymyr Y. Mayewsky
*Attorney, Agent, or Firm*—Michael J. Striker

[57] ABSTRACT

The disclosed apparatus has a spark gap at which optical fibers are to be exposed to spark erosion treatment. The spark gap receives electrical energy from a spark-impulse transformer with the secondary winding of which it is connected by means of a length of coaxial charging cable. A firing circuit has its output connected with the primary winding of the transformer and its input connected with a control circuit which includes a multi-vibrator that can be adjusted as to its pulse-repetition frequency.

14 Claims, 4 Drawing Figures

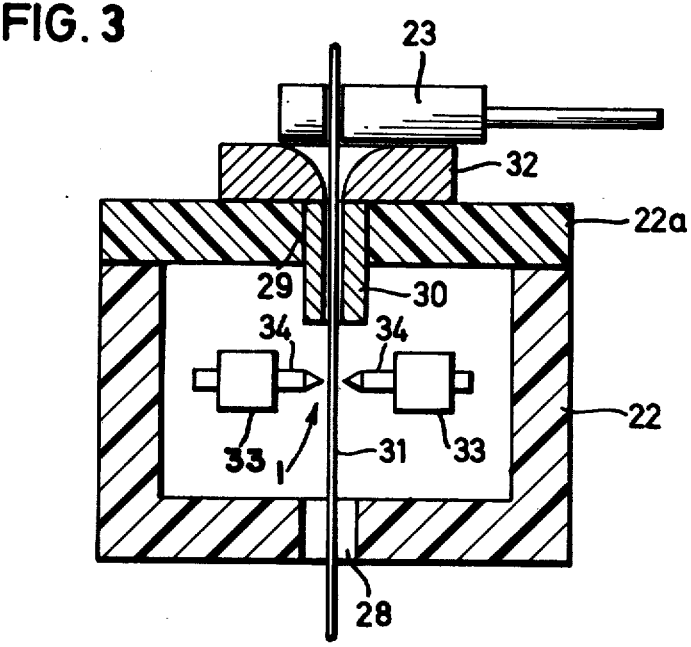
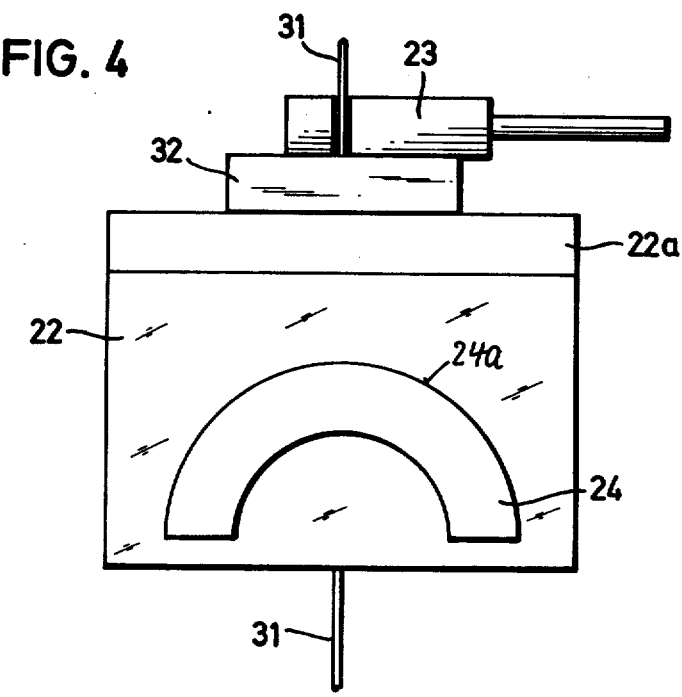

APPARATUS FOR TREATING OPTICAL FIBERS BY SPARK EROSION

BACKGROUND OF THE INVENTION

1. Field of the Invention

This invention relates to the treating of optical fibers in general, and more particularly to an apparatus for treating optical fibers by spark erosion.

2. The Prior Art

Optical fibers (sometimes referred-to as "fiber optics") are by now well established in a variety of applications. For example, in automobiles they are used to monitor the condition of certain lights (e.g. tail lights) to aprise the operator that the lights are functioning. Other applications have been developed for the home (mostly decorative), for the military and for industry. The widest use of optical fibers is found in industry where they are employed as wave guides to transmit signals, pictures and the like. It will be recalled that the principle of operation of optical fibers is that these fibers, which are usually of glass, are provided with an external reflective coating and then when light is applied to one end face of the fiber it is transmitted to the other end face of the fiber by a process of total reflection.

It is extremely important that the end face of each optical fiber be as smooth as possible and be located as closely as possible in a plane extending normal to the elongation of the fiber so that, if the end faces of two fibers are connected, or where the fibers are connected to the optical sender or receiver, minimum light losses will occur. This problem has been realized and attempts have been made to meet these requirements, namely to make the end faces of the fibers planar and located in a plane extending normal to the elongation of the fibers. One approach was described by Gloge, Smith, Bisbee and Chinnock in "Optical Fiber End Preparation for Low-loss Splices", Bell Systems Technology Journal, 1973, 52, pp. 1579–1588 and also by Murata, Inao, Matsuda and Takahashi in "Splicing of Optical Fiber Cable on Site", IEE Conference publication 1975, No. 132, pp. 93–95. Both sets of authors suggest to bend the fibers over a cylindrical tool having a certain radius of curvature and to slightly score the surface of the fiber with a diamond to cause a break in the fiber due to the stresses which were established in it by bending it over the cylindrical tool. This proposal works very well but is relatively complicated and difficult to carry out so that it is not well suited for commercial applications where it must be possible to employ a process that is simple and therefore inexpensive and which can be carried out by semi-skilled or even unskilled personnel.

Another proposal was made by Caspers and Neumann and described under the title "Optical-Fiber End Preparation by Spark Erosion" in Electronics Letters, Aug. 19, 1976, volume 12, No. 17. According to this proposal the fiber surface is subjected to spark erosion and thereafter the fiber is broken by hand, the break taking place at the point eroded by the sparks and end faces being produced at the break which are smooth and located in a plane normal to the elongation of the fiber. However, no commercially suitable apparatus has heretofore been proposed for carrying this latter proposal into effect.

SUMMARY OF THE INVENTION

Accordingly, it is an object of the present invention to provide such an apparatus.

More particularly, it is an object of the invention to provide an apparatus for treating optical fibers by spark erosion which is inexpensive to manufacture, small in dimensions and light in weight so that it can be readily transported, and which is reliable and safe in use.

In keeping with these objects, and with others which will become apparent hereafter, a feature of the invention resides in an apparatus for treating optical fibers by spark erosion which, briefly stated, may comprise means forming a spark gap at which optical fibers are to be exposed to spark erosion treatment, a spark-impulse transformer having a primary winding and a secondary winding, and a charging cable which connects the spark gap means with the secondary winding. The apparatus may further comprise a firing circuit having an output connected with the primary winding of the transformer, and an input which is connected with a control circuit for the firing circuit and which includes a multi-vibrator that is advantageously adjustable in its pulse-repetition frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 3 is a horizontal section showing a detail of the apparatus which is not visible in FIG. 2; and FIG. 4 is a front view of the component that is shown sectioned in FIG. 3.

DESCRIPTION OF THE PREFERRED EMBODIMENTS

Figure 1:
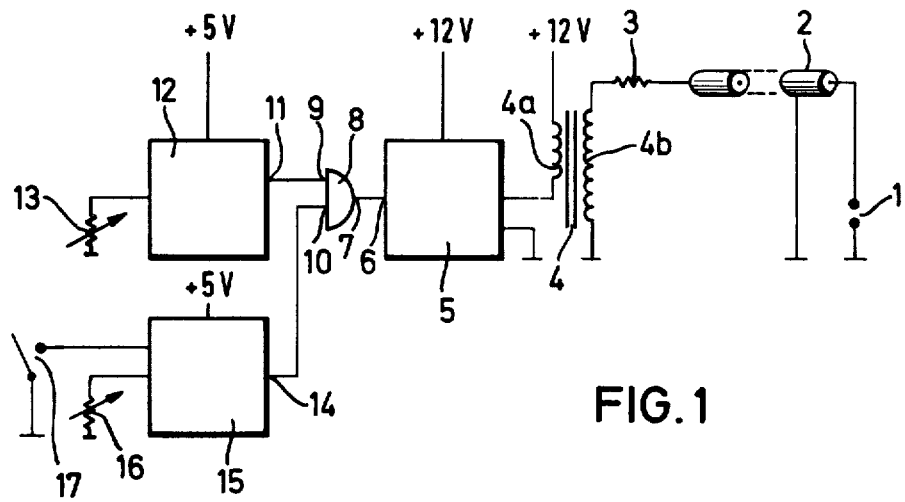
FIG. 1 is a circuit diagram of an apparatus according to the invention, with parts omitted.

Referring firstly to FIG. 1 it will be seen that this illustrates a circuit diagram of the apparatus according to the present invention. Reference numeral 1 identifies a spark gap having the two diagrammatically illustrated electrodes (details will be described with reference to FIG. 3). The spark gap is connected with a charging cable 2 which is a length of coaxial cable (usually having a length of about 1 meter) and which is provided to limit the energy of the sparks that develop in the spark gap, as will be described later. For the same purpose there is provided a current-limiting resistor 3 which may have a 100 k/ohm value and which is in turn connected between the charging cable 2 and the high-voltage output of the secondary winding 4b of a spark-impulse transformer 4. The primary winding 4a of the transformer 4 receives electrical energy pulses from the transistorized firing circuit 5 whose input 6 is connected with the output 7 of an AND-gate 8. The AND-gate 8 has one input 9 connected to the output 11 of a multivibrator 12 which is advantageously adjustable so that its pulse-repetition can be changed. For this purpose the multi-vibrator 12 has an input which is connected with a control element 13 (variable resistor) so that the pulse repetition frequency can be varied, preferably between about 100 and about 600 cycles.

The AND-gate 8 also has a second input 10 which is connected with an output 14 of a timing circuit 15. It is advantageous if both the timing circuit 15 and the multivibrator 12 are provided in form of integrated circuits and if the timing circuit 15 is so adjustable—by means of the variable resistor 16—that its timing setting can be varied between about 5 and about 30 seconds. A switch 17 (such as a pushbutton, see FIG. 2) is provided which, when closed, initiates the operation of the timing circuit and, hence, the operation of the spark gap 1.

Figure 2:
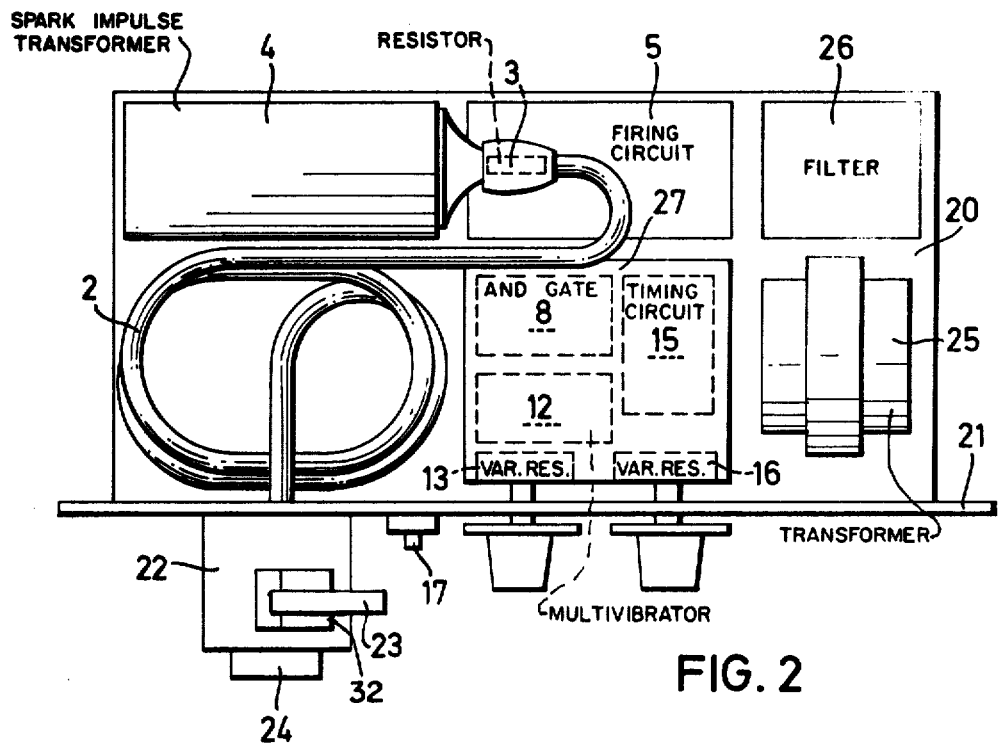
FIG. 2 is a somewhat diagrammatic top-plan view illustrating the structure of the apparatus of FIG. 1.

FIG. 2 shows the physical arrangement of the components of the apparatus in somewhat diagrammatic form. The components in FIG. 2 have the same reference numerals as in FIG. 1 and are all mounted on a base plate 20 which has an upstanding front face plate 21. Also mounted on the base plate are a transformer 25 which transforms net current down to the required operating voltage and a rectifier- and filter network 26. All of the components are, of course, electrically connected in the manner shown in FIG. 1. The charging cable 2 which, as mentioned before, may have a length of about 1 meter, is mounted in coiled condition as shown so as to require a minimum amount of space. The AND-gate 8, the multivibrator 12 and the timing circuit 15 are all sensitive to high voltage pulses and, to protect them against damage from such pulses, they are mounted in a shielded housing 27. An insulating housing 22 is mounted on the outer or forward side of the face plate 21 and located in its interior (to be described presently) is the spark gap 1 which receives its energy from the charging cable 2.

FIGS. 3 and 4 show the insulating housing 22 in more detail. In FIG. 3 the housing 22 will be seen to have an interior chamber which is closed by a cover 22a. Two opposite walls of the housing 22, namely one end wall and the cover 22a thereof, are provided with registering apertures 28, 29. Mounted in the interior of the housing 22 are two holders, 33 in each of which an electrode 34 of the spark gap 1 (preferably of Wolfram) is received so that it can be shifted lengthwise of itself. The tips of the electrodes 34 are thus located at opposite sides of a line passing centrally through the registering apertures 28, 29 and, depending upon how far the electrodes 34 are shifted towards one another and towards this (imaginary) line the distance between these tips can be varied, preferably between about 0.5 and about 3 millimeters. The electrodes 34 may be mounted in appropriate passages of the holders, 33 with a slight friction fit so that they can be readily shifted and due to the illustrated arrangement the width of the gap between the tips can be easily set and measured. One or both of the openings 28, 29 (in FIG. 3 only the opening 29) is provided with an inserted capillary tube 30, i.e. a tube having a passage therethrough which is of capillary cross-section, that is to say which has a very small cross-section. The purpose of this is to facilitate the proper insertion and positioning of an optical fibers 31 which is to be placed into the housing 22 and into the gap defined between the tips of the electrodes 34. A member 32 is mounted on the outside of the cover 22a and has a hole which registers with the passage of the tube 30. The surface portions bounding this hole in the member 32 are curved, converging inwardly of the hole and of the aperture 29 in a funnel-shaped configuration so as to facilitate the entry of the respective optical fibers 31. The radius of curvature may be so chosen as to be between substantially 10 and substantially 40 millimeters, for reasons which will be described subsequently. A clamping arrangement 32 is provided which arrests the optical fiber 31 after it has been inserted to the position shown in FIG. 3, so that it will not move during erosion of its surface by the sparks emanating from the tips of the electrodes 34. Any suitable and known per se clamping arrangement will suffice, as long as it does not damage the fibers 31.

FIG. 4 shows the housing 22 again, but this time in a front view as compared to FIG. 3 (see also FIG. 2 which is a top view). It will be seen that the front of the housing 22 carries a profiled member 24 which is advantageously mounted on it so that it can be readily removed. The member 24 has an arcuately curved surface 24a the radius of curvature of which may be between substantially 10 and substantially 40 millimeters. The particular radius of curvature is determined empirically for each particular fiber type, and of course the fibers 31 are withdrawn from the housing 22 subsequent to the spark erosion treatment and are bent over the surface 24a so that they snap apart at the line where the erosion has occurred. Since the member 24 may be removably mounted it can be replaced with a member having a surface 24a of a different radius of curvature whenever a different type of fiber (requiring a different bending radius to break at the line of spark erosion) is being treated. However, it is also possible (although not absolutely necessary) to have the surfaces bounding the funnel-shaped inlet of the member 32 bent on a radius of curvature of between substantially 10 and 40 millimeters, so that the fiber can be broken by withdrawing it only partially from the housing 22 and bending it over the surfaces bounding the funnel-shaped inlet. If in an exceptional instance the fiber does not break right away it is simply reinserted into the housing 22 and the erosion treatment repeated, whereupon the bending is also repeated and breaking will then take place. The breaking at the line of erosion produces surprisingly smooth end faces on the two broken-apart sections of the fiber and these end faces are located in planes normal to the elongation of the fiber, as desired.

The time period for which each individual fiber is subjected to the spark erosion treatment can be selected by turning the knob which operates the variable resistor 16 that in turn sets the timing circuit 15. The time required will vary for different fibers or for different fiber diameters and the fact that different time periods can be readily set makes it possible to adjust the device for any given requirement once the required time has been empirically determined.

Most of the components required for the construction of the apparatus are already commercially available so that the apparatus can be produced simply and very inexpensively.

By mounting all components on the base plate 20 with the face plate 21, the whole assembly can be readily slid into and out of a closed metallic housing, and the use of a metallic housing and the mounting of the components on the plates 20, 21 makes the apparatus suitable for use in situ, i.e. even in the rough operating conditions of a construction or assembly site. Also, the use of a closed metallic housing protects the surrounding areas against electromagnetic interference so that the operation of the apparatus according to the invention does not interfere with the simultaneous operation of adjacent measuring and analogous equipment, even if such equipment is delicate and susceptible to such interference. Furthermore, by mounting the spark gap 1 in the insulating housing 22 the operator is protected against the high voltage which is required for operating the spark gap and, moreover, the housing 22 and the associated components serve for precisely positioning the fiber to be prepared relative to the electrodes of the spark gap. This positioning effect is, of course, made still more precise by the use of the capillary tube 30, or by the use of two of them.

Using Wolfram electrodes for the spark gap 1 reduces burn-off of the electrodes and thus substantially eliminates the need for frequent readjustment of the tips of the electrodes relative to one another to maintain a desired width of the gap. By clamping or otherwise arresting the fibers with the device 23 it is assured that even if the spark-erosion treatment takes a relatively prolonged time, i.e. on the order of 10 seconds, the fiber will not shift by itself or will not be shifted by accidental touching. Shielding the AND-gate 8, the multivibrator 12 and the timing circuit 15 which are susceptible to high frequency pulses, reduces the reliability of the device even under disadvantageous weather conditions.

Tests made with fibers, having a core diameter of 93 micron and a cladding or coating diameter (outer diameter) of 110 micron, appear to indicate that the exposure of the fiber to spark erosion increases the critical bending radius at which the fiber will break, and the greater the critical radius, the better the quality of the end faces obtained by breaking. It would appear that the required value of stress at the origin of fracture is reduced by the spark erosion and it is assumed that the reason for this is the existence of eroded azimuthal scratches (resulting from the sparks) which extend all around the fiber and which are not confined only to a small angular region, as is the case when the fiber is scored with a diamond in accordance with the prior art. No bias tension lengthwise of the fiber is to be applied at all and no lips caused by negative stress, mist or hackle zones have been observed when fibers are prepared in accordance with the apparatus disclosed herein.

The purpose of using the coaxial charging cable 2 is to assure that due to the very short impulse duration obtained with the coaxial cable (only a few nanoseconds) the depth of penetration of the thermal energy resulting from the sparks in the spark gap 1 is limited to the surface of the fiber so that the surface only becomes "scratched" and favorable conditions are established for obtaining the desired break.

It is a particular advantage of the present apparatus that it permits the treatment of optical fibers in their coated condition, i.e. optical fibers having a synthetic plastic or even metal coating for reflective purposes, without having to remove this coating perparatory to the spark erosion treatment. The removal of the coating is not easy and may lead to damage of the fiber in the area where the coating is removed. By eliminating the need for such a removal the apparatus according to the present invention is capable of treating not only uncoated but also coated fibers and thus has a very wide range of applicability.

While the invention has been illustrated and described as embodied in an apparatus for treating optical fibers by spark erosion, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for treating optical fibers by spark erosion, comprising a base; electrical means on said base and forming a spark gap at which optical fibers are to be exposed to spark erosion treatment, including a pair of electrodes which define a gap therebetween, and means for adjusting the spacing between said electrodes to vary the width of said gap; a housing of electrically insulating material surrounding said electrodes; means for arresting an optical fiber to be exposed to such treatment; a spark-impulse transformer having a primary winding and a secondary winding; an electric charge storing means connecting said spark gap means with said secondary winding; an electric firing circuit having an output connected with said primary winding, and an input; and an electric control circuit for said firing circuit connected to said input thereof and including a multivibrator.

2. The apparatus as defined in claim 1, said multivibrator being adjustable for varying its pulse-repetition frequency.

3. The apparatus as defined in claim 1; and further comprising a current-limiting resistor interposed between, and in circuit with, said secondary winding and said charge storing means.

4. The apparatus as defined in claim 1, said control circuit further comprising a timing circuit having an output, and an AND-gate having an output connected to said input of said firing circuit, a first input connected to said output of said multivibrator, and a second input connected to said output of said timing circuit.

5. The apparatus as defined in claim 4, wherein said control circuit further comprises a triggering switch for said timing circuit.

6. The apparatus as defined in claim 4, said timing circuit being adjustable, and said control circuit further comprising a triggering switch for the timing circuit.

7. The apparatus as defined in claim 1; said base having an upstanding face plate, said transformer, charge storing means and circuits being mounted on said base behind said face plate and forming with the base a push-pull insert for a housing; and said housing mounted at a front side of said face plate for movement with said base and having two registering openings, said spark gap means being mounted in said housing so that an imaginary line connecting said openings extends through the gap.

8. The apparatus as defined in claim 7, wherein at least one of said openings accommodates a replaceable capillary tube dimensioned to receive a portion of the respective optical fiber to be treated so as to position the same relative to said gap.

9. The apparatus as defined in claim 7; and further comprising a member mounted on the exterior of said housing and having a surface which is convexly curved on a predetermined radius.

10. The apparatus as defined in claim 9, wherein the radius of curvature of said surface is between substantially 10 and 40 mm.

11. The apparatus as defined in claim 9, wherein said member is detachably mounted on said housing.

12. The apparatus as defined in claim 7; and further comprising means outwardly adjacent at least one of said openings for arresting an optical fiber which is received in the same.

13. The apparatus as defined in claim 1, said spark gap means comprising a pair of Wolfram electrodes, and holders for replaceably mounting the same.

14. The apparatus as defined in claim 1; and further comprising a shielded housing surrounding said control circuit for shielding the same against high-voltage pulses.

* * * * *